(12) United States Patent
Ostholt

(10) Patent No.: US 6,412,846 B1
(45) Date of Patent: Jul. 2, 2002

(54) GRIPPER WITH FOUR GRIPPER JAWS WHICH CAN BE MOVED IN RADIALLY OUTWARD DIRECTION

(75) Inventor: Rüdiger Ostholt, Wetter (DE)

(73) Assignee: Demag Cranes & Components GmbH, Wetter (DE)

( * ) Notice: Subject to any disclaimer, the term of this patent is extended or adjusted under 35 U.S.C. 154(b) by 0 days.

(21) Appl. No.: 09/940,780

(22) Filed: Aug. 28, 2001

Related U.S. Application Data

(60) Provisional application No. 60/229,399, filed on Aug. 31, 2000.

(51) Int. Cl.$^7$ ................................................. B66C 1/54
(52) U.S. Cl. ............................................ 294/94; 294/88
(58) Field of Search ............................... 294/88, 93–96, 294/119.1, 86.24, 86.25, 116; 414/910, 911

(56) References Cited

U.S. PATENT DOCUMENTS

| | | | |
|---|---|---|---|
| 1,790,761 A | * 2/1931 | Ortolon | ................ 294/94 |
| 4,248,550 A | * 2/1981 | Blaschke et al. | ........... 173/130 |
| 5,439,264 A | * 8/1995 | Margiottiello | ........... 294/86.25 |
| 5,471,738 A | * 12/1995 | Burcham et al. | ............. 29/701 |

* cited by examiner

*Primary Examiner*—Dean J. Kramer
(74) *Attorney, Agent, or Firm*—Henry M. Feiereisen

(57) ABSTRACT

A gripper, has a frame for movably guiding four radially movable gripper jaws in four shafts which extend radially outwards. An arbor is disposed centrally between longitudinal carriers of the frame in parallel relationship thereto, whereby the arbor, at least over a portion of its length, is conically tapered downwardly and can be shifted longitudinally by a piston-cylinder unit. The gripper jaws are spring biased radial against the arbor, whereby the contact surfaces of the gripper jaws are configured in conformity with the outer arbor surface. Each gripper jaw includes a plate-shaped central element and at least two parallel plate-shaped lateral elements which are laterally disposed to the central element and include a depression directed towards the outer side of the gripper jaw and having a cross-section, which, as viewed in the direction of the lateral surface of the lateral element, may have the shape of an isosceles triangle.

9 Claims, 6 Drawing Sheets

GRIPPER WITH FOUR GRIPPER JAWS WHICH CAN BE MOVED IN RADIALLY OUTWARD DIRECTION

CROSS-REFERENCES TO RELATED APPLICATIONS

This application claims the benefit of prior filed provisional application, Appl. Ser. No. 60/229,399, filed Aug. 31, 2000, pursuant to 35 U.S.C. 119(e).

This application claims the priority of German Patent Application Serial No. DE 100 44 527.6, filed Sept. 4, 2000, the subject matter of which is incorporated herein by reference.

BACKGROUND OF THE INVENTION

The invention relates, in general, to a gripper having four gripper jaws which can be moved in radially outward direction, for grabbing loads, in particular from above.

Grippers with four gripper jaws are known in general, particularly for loads which need to be gripped at the top and which have a cylindrical carrier opening. For this, the gripper jaws are introduced into the carrier opening and they are moved in radially outward direction, so as to secure the load by clamping action. A gripper of this type has a single-piece frame in which the gripper jaws are guided so as to be radially movable and axially fixed. The frame has four parallel longitudinal carriers spaced from one another at uniform radial distance as well as uniform angular distance and having upper and lower ends which are respectively fixedly connected to one another by a plate-shaped face element. The frame prevents shifting of the gripper jaws in the longitudinal direction of the frame, that is, they are guided in such a manner that only a radial movement is permitted. The gripper jaws are in contact with the arbor by means of the force exerted by the reset springs and actuated by the arbor via the piston-cylinder unit. The longitudinal carriers and the face elements form four shafts which extend radially outward, for receiving the gripper jaws, with an arbor disposed centrally between the longitudinal carriers in parallel relationship. The arbor can be guided through an opening in the upper plate element to the exterior, and, at least over a portion of its lengths tapers downwards. The arbor can be shifted in longitudinal direction by means of a piston-cylinder unit which is securely fixed to the upper plate element, whereby the gripper jaws are respectively in contact with the arbor as a consequence of a force applied by a reset spring. The contact surfaces of the gripper jaws are configured in at least the region of contact in conformity to the outer surface area of the arbor, such that a longitudinal shifting movement of the arbor is respectively converted into a radially directed movement of the gripper jaws. In this manner, it is assured that the movement of the arbor in the longitudinal direction is converted into a radial movement of the gripper jaws.

A disadvantage of known grippers is that the assembly thereof includes a frame and gripper jaws, which are complicated to make and thus incur considerable expenditures.

It would therefore be desirable and advantageous to provide an improved gripper which obviates prior art shortcomings and which can be economically produced with reduced manufacturing and assembly expenditures and obviating the afore-stated drawbacks.

SUMMARY OF THE INVENTION

According to one aspect of the present invention, a gripper is provided having gripper jaws, wherein each gripper jaw is formed by a plate-shaped central element and at least two lateral elements which extend parallel with respect to one another and which are disposed laterally with respect to the central element, which lateral elements respectively are provided with a depression which is directed to the outer side of the gripper jaw. The depression may have a cross section in the form of an isosceles triangle, with a base side extending parallel to the longitudinal carriers and two shorter roof sides directed inwardly toward the arbor and having same length, whereby the two ends of the base side are provided with pockets for receiving the ends of a leaf spring, with the leaf spring, having an the outer side for central abutment of a tensioning element provided at the associated longitudinal carrier and engaging in the depression. Alternatively, the cross-section of the depression may have a projection which is directed away from the arbor into the depression and which is opposed by a longitudinal side extending parallel to the longitudinal carriers, with the leaf spring in the relaxed condition extending parallel to this longitudinal side. Secured to each of the ends of the leaf spring is a tensioning element which engages in the depression and is arranged at the associated longitudinal carrier, whereby the tensioning element and the projection are configured to respectively effect a corresponding reset force to move the gripper jaw in outward direction. The face elements are made from sheet metal, and the longitudinal carriers are made either of longitudinal profiles or from the legs of at least four U-shaped metal sheets, whereby the metal sheets are arranged in such a way that they provide a central free space of quadratic cross-section and are disposed, respectively by an angle of 90 degrees, in an offset manner about the central axis of the arbor. This sheet metal configuration can be made in a highly cost-efficient manner and can selectively be provided with equally highly economic longitudinal profiles, for example, angle profiles. The latter also is more appealing in appearance.

Exchange of the grippers can be easily implemented, when the piston-cylinder unit is connectable to the upper face element by means of a connector in the form of a bayonet coupling. Suitably, the arbor may include an upper and a lower arbor element which can be releasably connected to one another, whereby the upper arbor element is disposed in the piston-cylinder unit and the lower one is disposed in the frame. In a simple manner, the connector may includes pin-shaped closing elements which are arranged at the piston-cylinder unit and extend in the longitudinal direction of the cylinder beyond the outer contour, and which have thickened ends for passage through complementary openings of the face element which openings are tapered in circumferential direction. The closing elements are introduced into the tapered portion by turning the entire piston-cylinder unit.

To prevent an inadvertent release of this connection between the piston-cylinder unit and the frame, for locking at the piston-cylinder unit, there is provided a locking element which latches in a depression or through-opening in the face element.

In order to move the gripper jaws in outward direction only when the gripper is fully positioned on the load, it may be suitable to provide an annular control element which emits a control signal when the gripper has been fully positioned on the load.

According to another feature of the present invention, the plate-shaped elements of the gripper jaws and the U-shaped metal sheets can be cut to size by laser from sheet metal. In this way, manufacture of the gripper is highly cost-efficient. Manufacture may be simplified and cost-efficiency enhanced, when the arbor is designed in a rotation symmetric manner and the carrier opening is cylindrical.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1A:
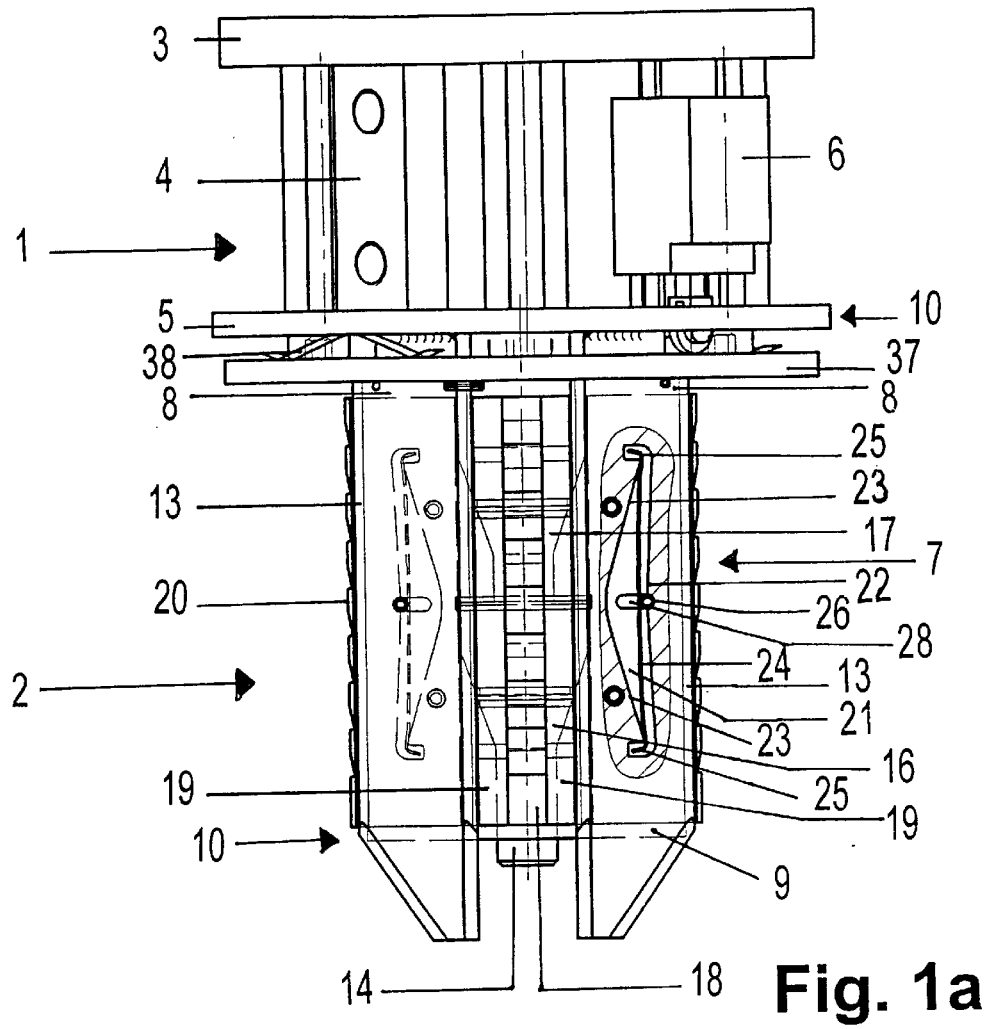
FIG. 1a is a front view of one embodiment of a gripper with angle profiles as longitudinal carriers.

Throughout all the Figures, same or corresponding elements are generally indicated by same reference numerals.

Figure 1B:
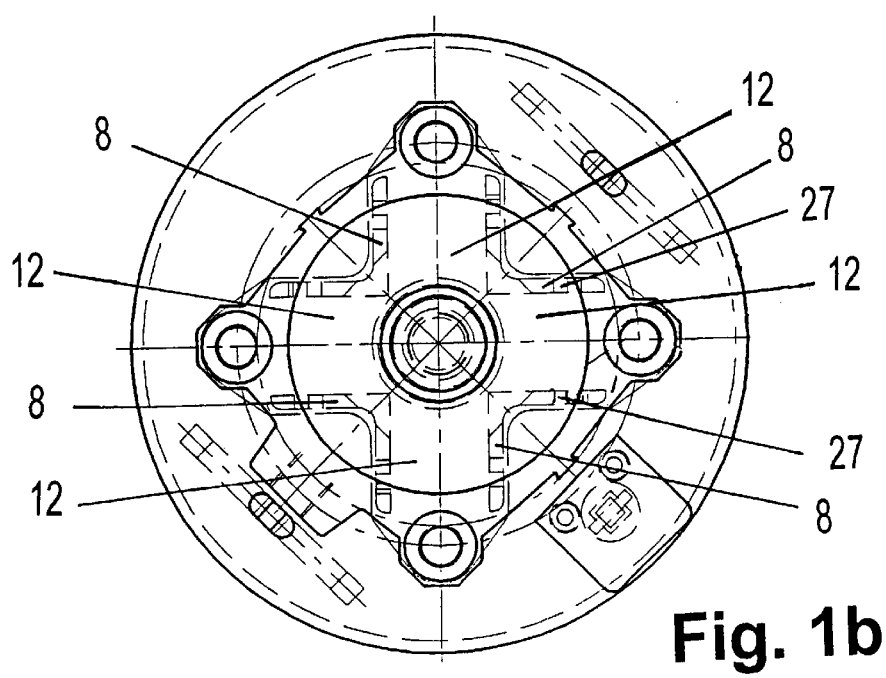
FIG. 1b is a plan view of the gripper.

FIGS. 1a, 1b illustrate a front view and a plan view of a gripper which includes an upper piston-cylinder unit, generally designated by reference numeral 1 and a lower gripper unit, generally designated by reference numeral 2.

The piston-cylinder unit 1 has an upper flange plate 3 for attachment of a pneumatic cylinder 4 which extends in downward direction and has a lower end which is firmly connected with an upper face plate 5 of the gripper unit 2. As best seen in FIG. 1a, a control unit 6 is disposed on the right hand side of the piston-cylinder unit 1 in opposition to the pneumatic cylinder 4. By means of the pneumatic cylinder 4, the face plate 5 and the flange plate 3 can be moved in opposite direction with respect to one another.

The gripper unit 2 includes a frame 7, which is made from four rectangular longitudinal profiles (angle profiles) as longitudinal carriers 8 and the face plate 5 (above), as well as the face sheet metal 9 (below), as plate-shaped face elements 10, whereby the face elements 10 and the longitudinal carriers 8 are firmly secured to one another, for example, by welding. As shown in FIG. 1b, the longitudinal carriers 8 are arranged at a same radial distance from the center line of the gripper unit 2 as well as at a same angular distance (90 degrees) with respect to one another. Arranged between the outer sides of two neighboring longitudinal carriers 8 is a shaft 12. The shafts 12 are confined at the top and at the bottom by the face elements 10. The gripper unit 2 further includes four gripper jaws 13 which are guided in the shafts 12 for radial displacement and secured in axial direction.

Provided centrally between the longitudinal carriers 8 is an arbor 14, which has, preferably, a rotation-symmetric configuration, and aligned in parallel relationship to the longitudinal carriers 8. The arbor 14 is guided upwardly through an opening in the face element 10 (face plate 5) out of the frame 7 into the piston-cylinder unit 1 for securement to the flange plate 3. In this manner, a movement that is effected by the pneumatic cylinder 4 on the flange plate 3 relative to the face element 10 (face plate 5), is converted into a longitudinal shift of the arbor 14 within the frame 7.

Figure 2:
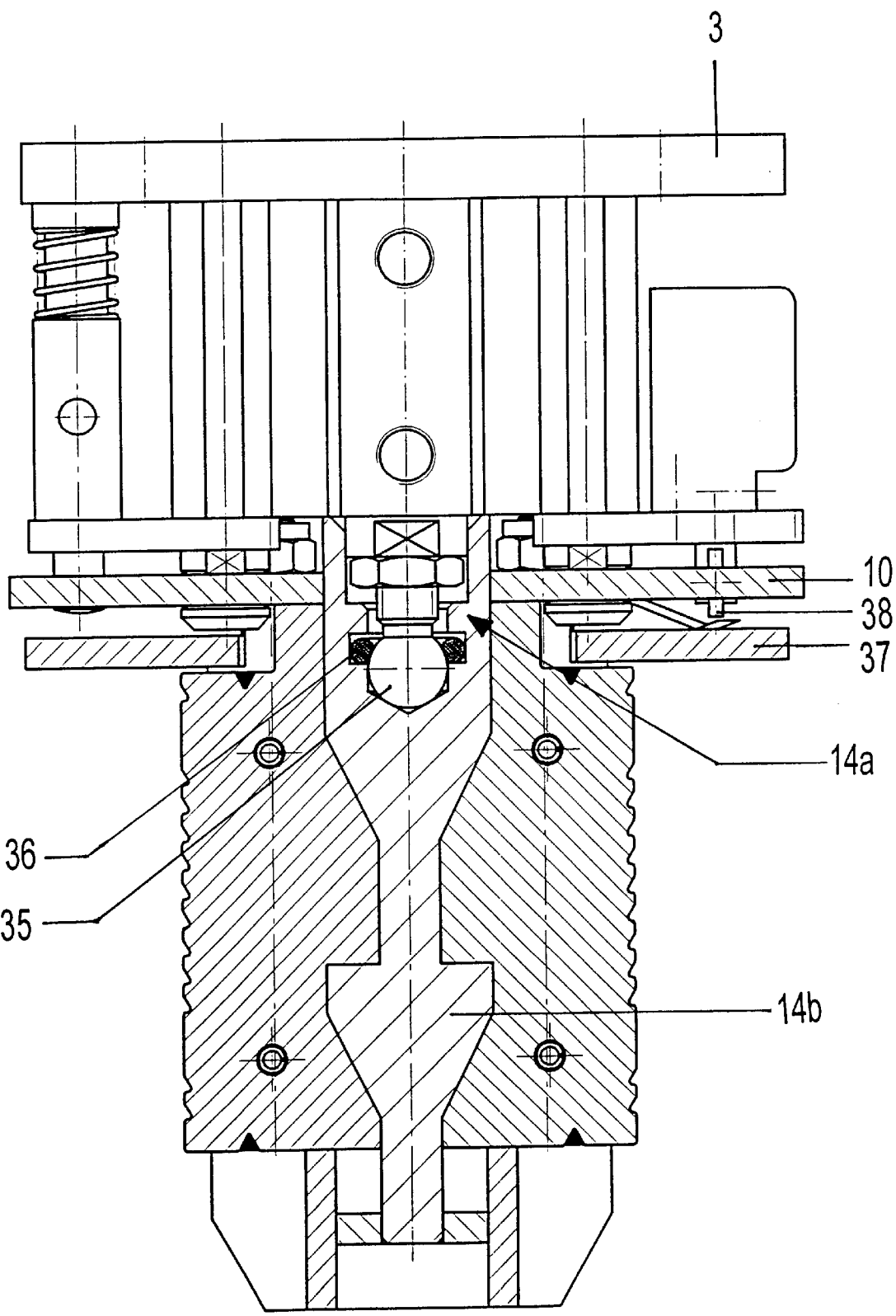
FIG. 2 is an illustration of another embodiment of a gripper with a releasable piston-cylinder unit and with U-shaped metal sheets as longitudinal carriers.

Within the frame 7, the arbor 14 has two conical tapers 16, 17 which are illustrated by dash lines in FIG. 1a (see also FIG. 2). At their side confronting the arbor, the gripper jaws 13 are acted upon by a spring force for abutment upon the outer surface area of the arbor 14. The contact surfaces of the gripper jaws 13 are configured in conformity with the outer surface area of the arbor 14, at least in the contact area, i.e., at least along the line of contact.

The two tapers 16, 17 and the complementary contact surfaces of the gripper jaws 13 convert a longitudinal shifting of the arbor 14 into a radial movement of the gripper jaws 13.

As is illustrated in FIG 1a, each gripper jaw 13 includes a central metal sheet which defines a plate-shaped central element 18. On both sides of the central element 18 are lateral metal sheets defining plate-shaped lateral element 19. Thus, each gripper jaw 13 is comprised of three sheets which are secured to one another. It is preferred that only the central element 18 is in contact with the arbor 14. As shown in FIG. 1a, in particular the central element 18 is provided with gripper teeth 20 which point in outward direction.

Each lateral element 19 is made of sheet metal and has a depression 21, which can be particularly viewed in FIG 1a in the shown break-away portion. The depression 21 is suitably produced by cutting the lateral elements 19 to form a through-opening with respective cross-sectional configuration. After securing the lateral elements 19 to the central element 18, for example, by welding, a depression 21 is formed which is directed to the outer side of the gripper jaw 13 and which is open on this side. The depression 21 is covered by the longitudinal carrier 8 which is in immediate opposite relationship.

Figure 6:
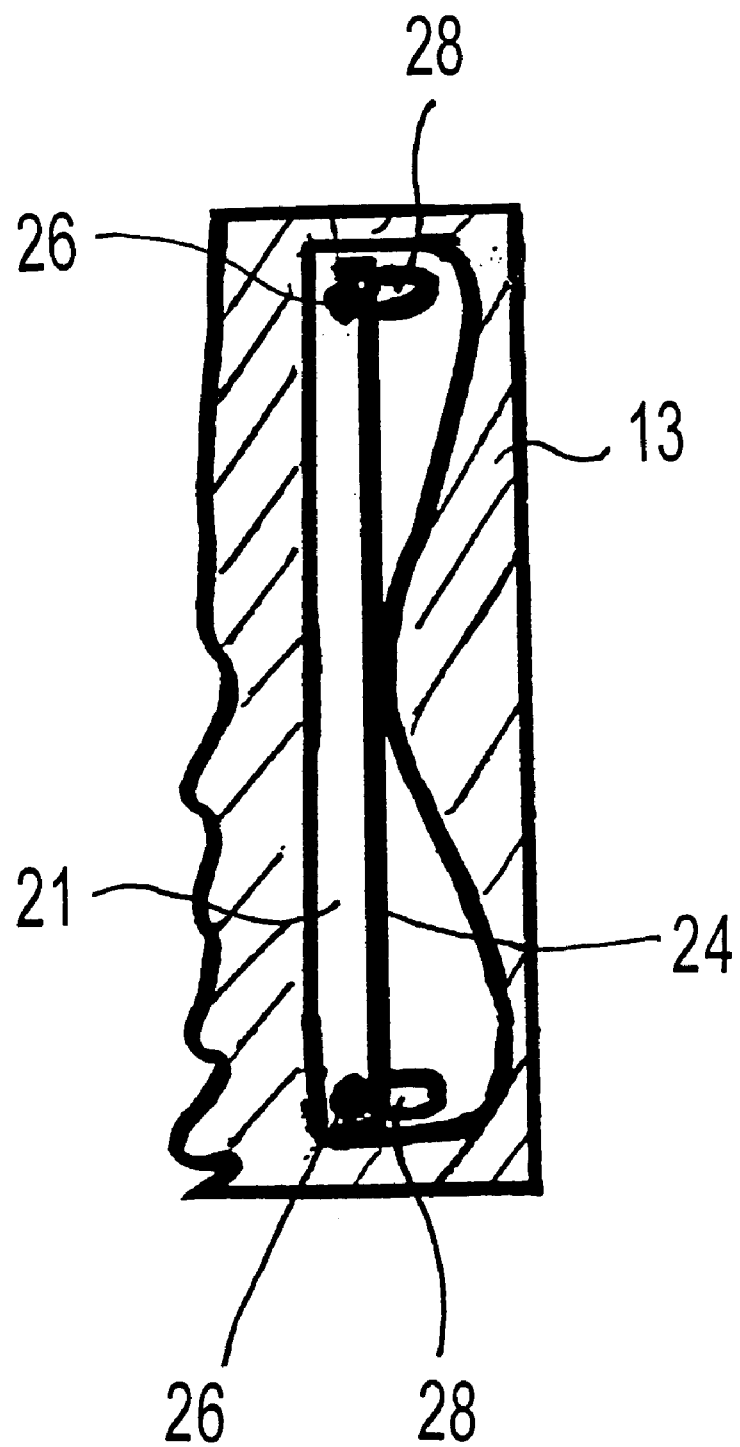
FIG. 6 shows a modified embodiment of a depression with leaf spring for provision in the grippers of FIGS. 1 and 2.

FIG. 1a illustrates that the cross-sectional configuration of the depression 21 cut lengthwise substantially resembles an isosceles triangle, with a base side 22 which extends parallel to the longitudinal carriers 8, and with two shorter roof sides 23, approximately of same length, which are directed inwardly towards the arbor 14, so that also the tip of the triangle points inwardly. A leaf spring 24 is positioned in the depression 21 and has angled ends which engage in pockets 25 provided at the ends of the base side 22. Bearing upon the outer side of the leaf spring 24 is a pin which serves as tensioning element 26 and is secured to the longitudinal carriers 8 at locations 27 (compare FIG. 1b). Of course, the tensioning element 26 can extend fully through the entire gripper jaw 13. To ensure the mobility in radial direction of the gripper jaws 18, they are provided with a slot 28 through which the tensioning element 26 is guided. A movement of the gripper jaws 13 in outward direction (due to a lengthwise shifting of the arbor 14), results in a tensioning of the leaf spring 24, which, as a consequence, applies a reset force in conformity with the displacement. A alternate configuration of the depression 21 is shown in FIG. 6.

FIG. 2 illustrates a gripper in accordance with FIG. 1, in which the piston-cylinder unit 1 can be connected, in the manner of a bayonet coupling, with the upper face element 10 (face plate 5), so that the gripper unit 2 can be quickly replaced by another one.

Figure 3:
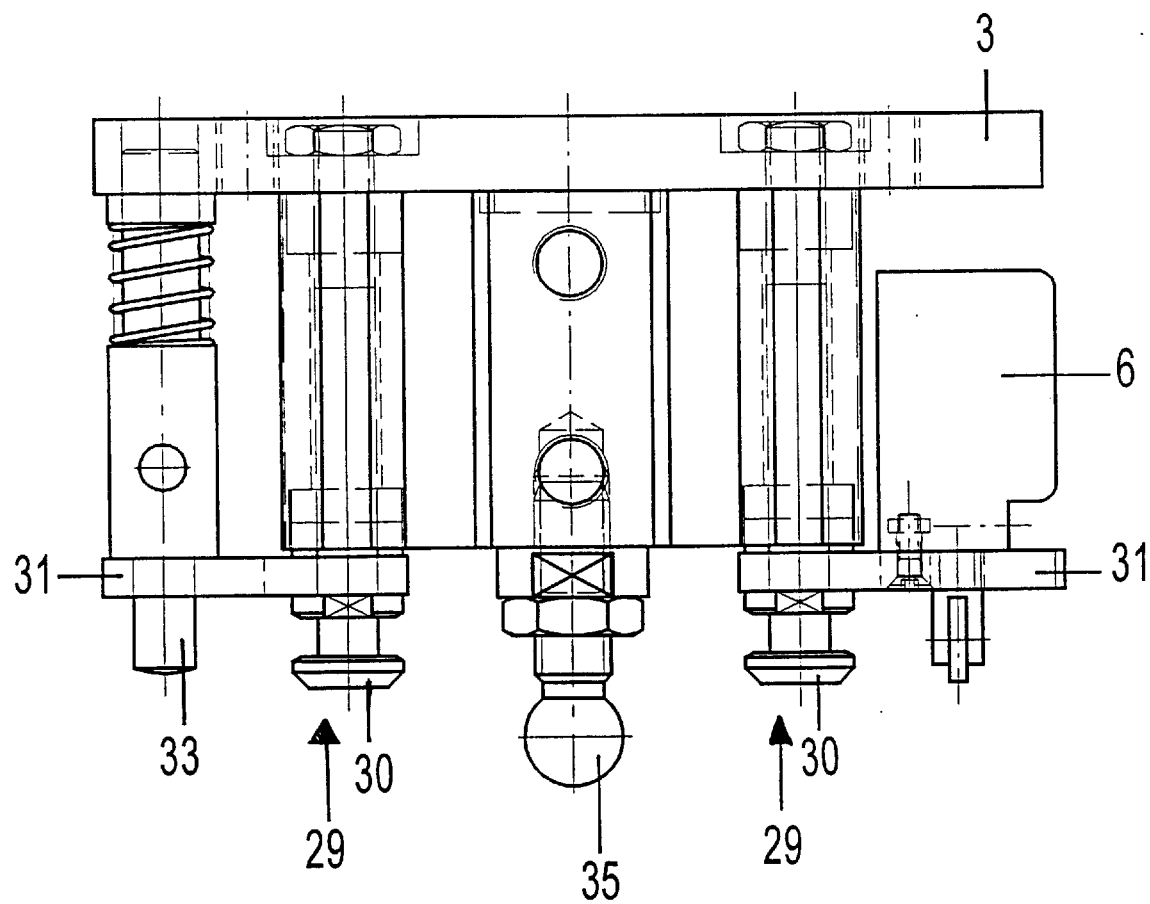
FIG. 3 is a detailed illustration of the releasable piston-cylinder unit.

The piston-cylinder unit 1, removed from the gripper unit 2, is illustrated in FIG. 3 and includes a plurality of pin-shaped closing elements 29 which extend, when viewed in the longitudinal direction of the cylinder of the pneumatic cylinder 4, through the face element 10 (face plate 5) (compare FIG. 2) downwardly in the frame 7, that is, they extend beyond the actual outer contour of the piston-cylinder unit 1. The free lower ends of the closing elements 29 have annular thickened portions 30. The thickened portion 30 is produced in such a way that a bolt, secured to the flange plate 3, is provided at its lower end with an annular groove. In addition, the bolt is secured on a support plate 31 on the side which is opposite to the flange plate 3.

Figure 4A:
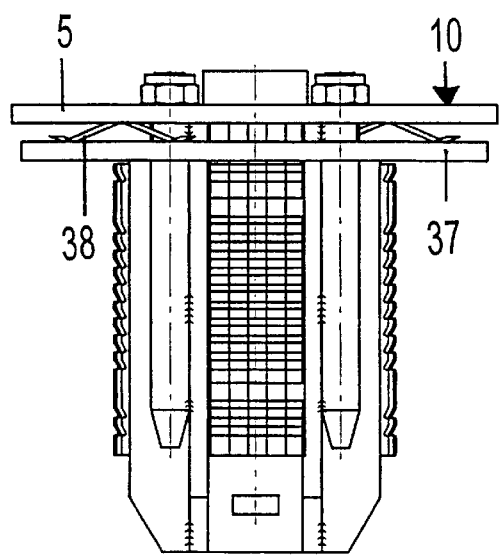
FIG. 4a is a front view of the gripper of FIG. 2, without piston-cylinder unit.
Figure 4B:
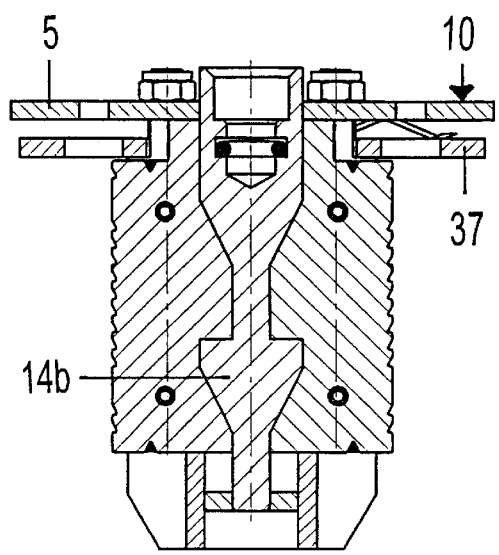
FIG. 4b is a sectional view of the gripper of FIG. 2, without piston-cylinder unit.
Figure 4C:
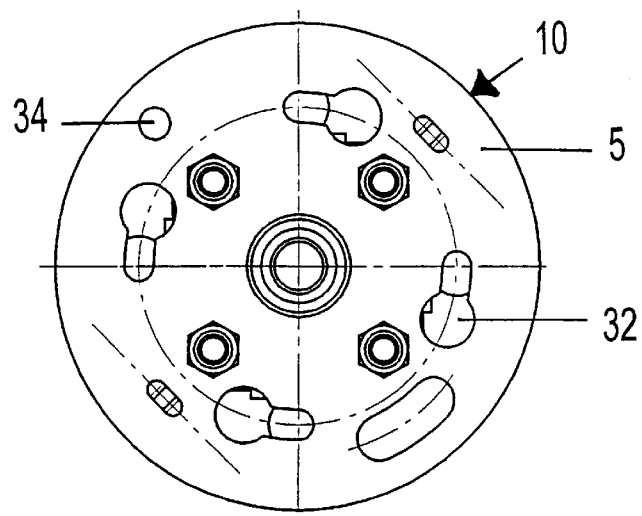
FIG. 4c is a plan view of the gripper of FIG. 2, without piston-cylinder unit.

FIGS. 4a–4c illustrate various views of the associated gripper unit 2. Particularly the plan view in FIG. 4c illustrates through-openings 32 in the face element 10 (face plate 5), which are formed as oblong holes and tapered in circumferential direction—in reference to FIG. 4—in counter-clockwise manner. The through-openings 32 are configured in conformity to the closing elements 29 which can be introduced with their thickened portions 30 through those portions of the through-openings 32 which are not tapered. Turning of the entire piston-cylinder unit 1 about the center line 11 or, respectively, about the arbor 14, effects a turning of the closing elements 29 into the portion that is reduced in size, such that these engage in the grooves of the closing elements 29 and secure the piston-cylinder unit 1 in axial direction. In the final position, a spring-biased cylinder 33 (compare FIG. 3) is engaged in a through-bore 34 which is provided at the face element 10 (face plate 5), and provides a radial securement of the piston-cylinder unit 1.

As is illustrated in FIGS. 2 to 4, the arbor 14 is made of two components. The arbor 14 includes an upper arbor element 14a and a lower arbor element 14b, which are releasably connected to one another. The connection is achieved by means of a spherical head 35 disposed at the lower end of the upper arbor element 14a and configured for insertion in latching engagement into a complementary depression of the lower arbor element 14b. The latch element is provided by a spring element 36 which has the only function to transfer vertically directed forces from the upper arbor element 14a to the lower 14b during extraction of the arbor 14 from the frame 7. The upper arbor element 14a, in accordance with FIG. 2, is arranged in the piston-cylinder unit 1 and the lower 14b is arranged in the frame 7.

As further illustrated in FIGS. 1a, 1b and 2, below the face element 10 (face plate 5), there is provided a control ring 37 which is movable in the longitudinal direction of the arbor 14 and is pressed away by means of springs 38 from the face element 10. As can be best seen from FIG. 2, the control ring 37 actuates a control element 38 of the control unit 6. The control ring 37 can not be turned radially, i.e. it is secured against turning, and triggers a control signal when a gripper is completely positioned on the load. Furthermore, the thickened portions 30 pass hereby into through-openings in the control element 37, so as to realize an additional safety locking of the piston-cylinder unit 1.

Figure 5A:
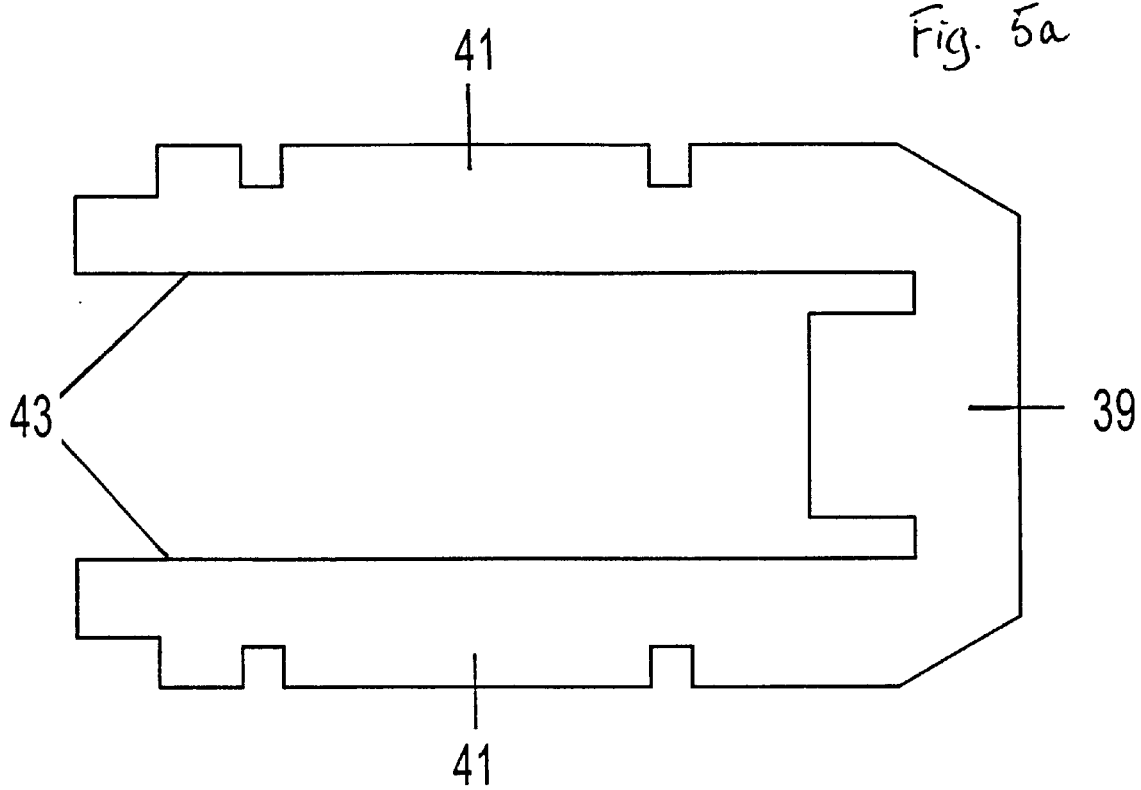
FIGS. 5a, b show the U-shaped metal sheets of the longitudinal carrier in accordance with FIG. 2.
Figure 5B:
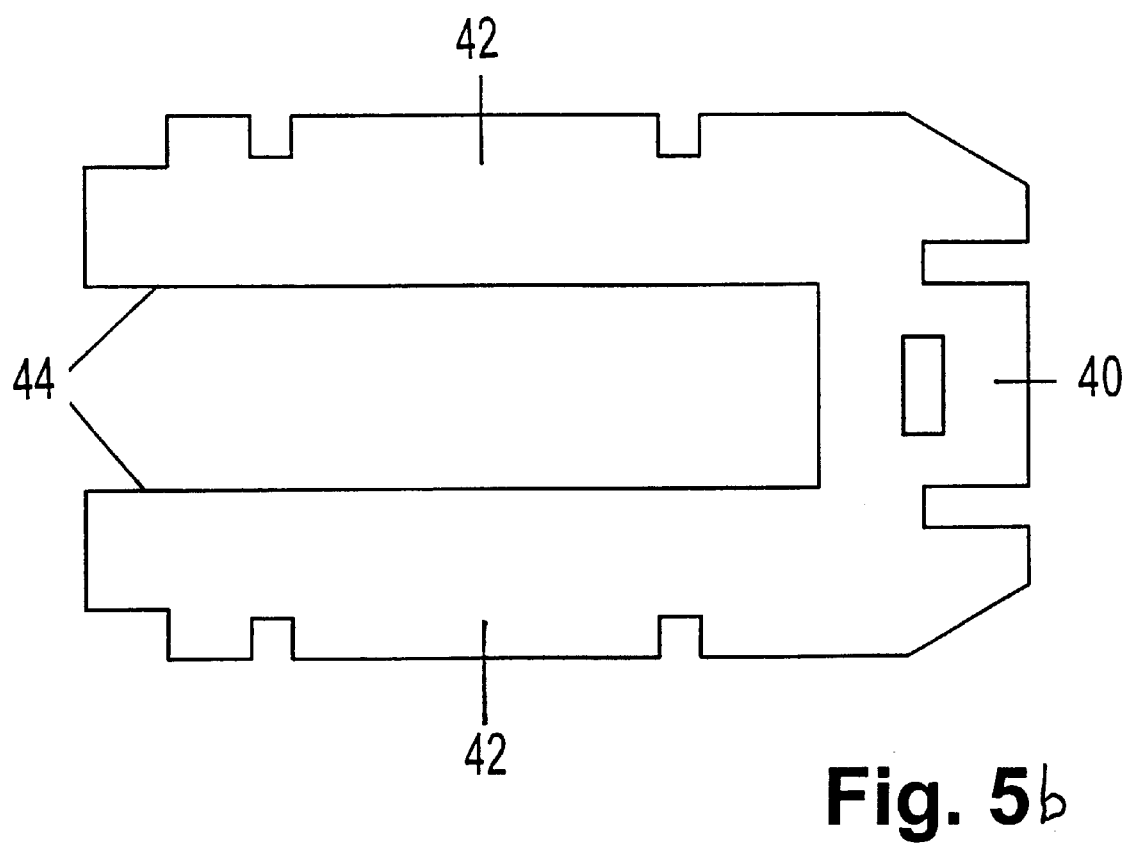

While FIGS. 1a and 1b illustrate a frame which is made from angle profiles as longitudinal carriers 8, FIGS. 2 and 4 illustrate a frame 7 which is made from U-shaped metal sheets 39, 40, as shown in detail in FIGS. 5a, 5b. Each metal sheet 39, 40 has two legs 41, 42. The distance between two confronting inner sides 43, 44 of the legs 41, 42 is so selected that respectively two pairs of metal sheets 39, 40 can be plugged together in offset relationship at an angle of 90 degrees, whereby same sheets 39 or 40 are arranged in pairs in opposite relationship. Four metal sheets 39, 40, plugged together in corresponding manner, have a central free space in their interior for insertion of at least the lower portion of the arbor 14b. In this embodiment, the legs 41, 42 define the longitudinal carriers 8. The contour of the metal sheets 39, 40 is cut by laser in a cost-efficient manner from a sheet metal.

The gripper unit 2 is introduced into a carrier opening, for example, of cylindrical configuration. The gripper which is suspended from a rope preferably serves to grab loads from above. Of course, other applications are within the scope of the invention.

FIG. 6 illustrates a modified embodiment of the depression, comprising a depression of like formation 21 for receiving therein a leaf spring 24 which can be biased by a tensioning element 26 that is guided at respective ends of the leaf spring 24 in slots 28.

While the invention has been illustrated and described as embodied in a gripper with four gripper jaws which can be moved in radially outward direction, it is not intended to be limited to the details shown since various modifications and structural changes may be made without departing in any way from the spirit of the present invention.

What is claimed as new and desired to be protected by Letters Patent is set forth in the appended claims:

1. A gripper for grabbing a load, comprising:
   a frame including four spaced-apart longitudinal carriers disposed in parallel relationship at same radial distance from one another and at same angular distance, each of said longitudinal carriers including an upper end and a lower end;
   four gripper jaws guided in the frame for radial movement and fixed therein against axial displacement,
   a first plate-shaped face element for connecting the upper ends of the longitudinal carriers and a second plate-shaped face element for connecting the lower ends of the longitudinal carriers;
   wherein the longitudinal carriers and the plate-shaped face elements define four shafts which extend radially outward for receiving the gripper jaws;
   an arbor centrally disposed between the longitudinal carriers in parallel relationship thereto and extending to the exterior through an opening of the first plate-shaped face element, said arbor being conically tapered at least over a portion of its length within said frame;
   a piston-cylinder unit, securely fixed to the first plate-shaped face element, for moving the arbor in longitudinal direction;
   four springs, each of the springs provided for biasing the gripper jaws into contact with the arbor, whereby the springs and the gripper jaws are placed into one-to-one correspondence, wherein the gripper jaws have contact surfaces complementing an outer surface area of the arbor, so that a longitudinal displacement of the arbor is converted into a radial movement of the gripper jaws;
   wherein each gripper jaw includes a plate-shaped central element and at least two parallel lateral elements arranged laterally on the central element, each of the lateral elements provided with a depression directed to an outer side of the gripper jaw and having a cross-section, as viewed in a direction of a lateral surface of the lateral elements, of a configuration of one of (a) and (b):
   (a) in the form of an isosceles triangle, with a base side extending parallel to the longitudinal carriers, and two smaller roof sides directed inwardly toward the arbor and having a same length, wherein the base side has two ends formed with pockets for receiving therein respective ends of the spring whose outer side is in contact with a tensioning element provided centrally at the associated longitudinal carrier and in engagement with the depression; and (b) in the form of a projection which is directed away from the arbor into the depression which is opposed by a longitudinal side in parallel relationship to the longitudinal carriers, with the spring, in its relaxed condition, extending parallel to the longitudinal side and having ends for securement of a tensioning element, wherein the tensioning element engages the depression and is arranged at the associated longitudinal carrier, wherein the tensioning element and the projection are configured to respectively effect a corresponding reset force to move a respective gripper jaw in outward direction;

wherein at least one of said first plate-shaped face element and said second plate-shaped face element is made of metal sheets, wherein the longitudinal carriers are made from one of longitudinal profiles, and legs of at least four U-shaped metal sheets, with the sheets being configured such as to have a central free space of square cross-section and disposed by an angle of 90 degrees, in an offset manner about a central axis of the arbor.

2. The gripper of claim 1, wherein said piston-cylinder unit is operatively connectable to the first plate-shaped face element by a connector in the form of a bayonet coupling.

3. The gripper of claim 2, wherein the connector includes pin-shaped closing elements arranged at the piston-cylinder unit and extending in the longitudinal direction of the cylinder beyond an outer contour thereof, said closing elements comprising thickened ends for passage through complementary through-openings of the first plate-shaped face element; said through-openings tapering in circumferential direction, so that the closing elements engage the tapered portion of the through openings when the piston-cylinder unit is turned.

4. The gripper of claim 1, wherein the arbor includes an upper arbor element disposed in the piston-cylinder unit, and a lower arbor element disposed in the frame, wherein the upper arbor element and the lower arbor element are releasably connectable to one another.

5. The gripper of claim 1, and further comprising a locking element for locking at the piston-cylinder, said locking element being configured to latch in one of the depression, and a through-opening in the first plate-shaped face element.

6. The gripper of claim 1, and further comprising:- an annular control element configured to emit a control signal when the gripper has been fully positioned on the load.

7. The gripper of claim 1, wherein the central elements, the lateral elements, at least one of the first and second plate-shaped face elements, and the U-shaped metal sheets are made from laser-cut sheet metal.

8. The gripper of claim 1, wherein the arbor has a rotation symmetric configuration, and the load has a cylindrical carrier opening.

9. The gripper of claim 1, wherein the springs are leaf springs.

* * * * *